United States Patent
Choi (10) Patent No.: US 10,976,862 B2
(45) Date of Patent: Apr. 13, 2021

(54) TOUCH DRIVING CIRCUIT DRIVING TOUCH ELECTRODE, TOUCH CONTROLLER CONTROLLING TOUCH DRIVING CIRCUIT, AND TOUCH DISPLAY DEVICE INCLUDING TOUCH DRIVING CIRCUIT AND TOUCH CONTROLLER

(71) Applicant: LG Display Co., Ltd., Seoul (KR)

(72) Inventor: Yongwoo Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 83 days.

(21) Appl. No.: 16/151,749

(22) Filed: Oct. 4, 2018

(65) Prior Publication Data

US 2019/0129571 A1 May 2, 2019

(30) Foreign Application Priority Data

Oct. 30, 2017 (KR) .......................... 10-2017-0142727

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................... G06F 3/0418; G06F 3/044
See application file for complete search history.

(56) References Cited

U.S. PATENT DOCUMENTS

| | | | | |
|---|---|---|---|---|
| 2005/0093634 A1* | 5/2005 | Smith | .................. | H03K 3/0315 331/16 |
| 2016/0065192 A1* | 3/2016 | Lee | .......................... | H03K 5/26 327/163 |
| 2016/0246262 A1* | 8/2016 | Liu | .......................... | H03M 1/34 |
| 2018/0107238 A1* | 4/2018 | Yamamoto | ............. | H03B 5/362 |

* cited by examiner

*Primary Examiner* — Kwang-Su Yang
(74) *Attorney, Agent, or Firm* — Morgan, Lewis & Bockius LLP (57) ABSTRACT

Exemplary embodiments of the present disclosure relate to a touch driving circuit that operates according to an internal clock signal and a touch controller that calibrates a variation in internal clock signal between touch driving circuits. The touch driving circuit operates using an internal clock signal, thus preventing electromagnetic interference caused by a clock signal line that connects the touch controller and a plurality of touch driving circuits. Further, the touch controller calibrates the output frequencies of internal clock signals of the respective touch driving circuits to be the same on the basis of the counting values of the internal clock signals of the touch driving circuits, which are obtained during a certain period before performing touch sensing, and performs touch sensing, thereby performing touch sensing while controlling the plurality of touch driving circuits operating with the internal clock signals without any operational variation.

13 Claims, 11 Drawing Sheets

Clock Signal Generator (example : Ring Oscillator)

TOUCH DRIVING CIRCUIT DRIVING TOUCH ELECTRODE, TOUCH CONTROLLER CONTROLLING TOUCH DRIVING CIRCUIT, AND TOUCH DISPLAY DEVICE INCLUDING TOUCH DRIVING CIRCUIT AND TOUCH CONTROLLER

CROSS REFERENCE TO RELATED APPLICATION

This application claims priority from Korean Patent Application No. 10-2017-0142727, filed on Oct. 30, 2017, which is hereby incorporated by reference for all purposes as if fully set forth herein.

BACKGROUND

1. Technical Field

The present disclosure relates to a touch driving circuit, a touch controller, a touch display device, and a method for driving the same.

2. Discussion of the Related Art

With the development of the information-oriented society, there is growing demand from users for display devices for displaying images, and accordingly, different types of display devices, such as a Liquid Crystal Display (LCD) device, a Plasma Display Panel (PDP), and an Organic Light-Emitting Display device (OLED), have been used.

Such display devices provide functions of sensing a user's touch on a display panel and processing input based on sensed touch in order to offer a wide range of functions.

A display device capable of touch recognition may include, for example, a plurality of touch electrodes disposed on a display panel, a touch driving circuit to drive the plurality of touch electrodes, and a touch controller to control the touch driving circuit.

The touch driving circuit drives the plurality of touch electrodes disposed on the display panel and transmits data sensed from the touch electrodes to the touch controller during a touch operation. The touch controller may sense a user's touch on the display panel using the sensed data transmitted from the touch driving circuit.

Here, the display device may include a plurality of touch driving circuits, and the touch controller may output a signal to control the operation of the plurality of touch driving circuits to the plurality of touch driving circuits.

Here, the touch controller outputs signals of the same frequency to control the individual operations of the plurality of touch driving circuits in order to equally control the individual operations of the plurality of touch driving circuits.

Therefore, the touch controller and the plurality of touch driving circuits may be connected by a signal line for transmitting operation control signals of the same frequency, and the signal line functions as an antenna to possibly cause electromagnetic interference.

SUMMARY

Accordingly, embodiments of the present disclosure are directed to a touch driving circuit, a touch controller, and a touch display device that substantially obviates one or more of the problems due to limitations and disadvantages of the related art.

An aspect of the present disclosure is to provide a touch driving circuit, a touch controller, and a touch display device which are capable of preventing electromagnetic interference caused by a signal line for transmitting an operation control signal for a touch driving circuit from a touch controller to the touch driving circuit in a touch display device.

Another aspect of the present disclosure is to provide a touch driving circuit, a touch controller, and a touch display device which enables a touch controller to control a plurality of touch driving circuits without any operational variation.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display device comprises a touch display panel on which a plurality of touch electrodes is disposed; a plurality of touch driving circuits configured to drive at least one touch electrode among the plurality of touch electrodes; and a touch controller configured to control the plurality of touch driving circuits.

The touch controller may output a first-level counter enable signal to the plurality of touch driving circuits during a first time period and may output a second-level counter enable signal to the plurality of touch driving circuits during a second time period and a third time period The touch controller may obtain a counting value of an internal clock signal of the plurality of touch driving circuits in the second time period and may output a calibration value for the internal clock signal to at least one of the plurality of touch driving circuits in the third time period.

In another aspect, a touch controller comprises a counter enable signal outputter configured to output a first-level counter enable signal to a plurality of touch driving circuits during a first time period and to output a second-level counter enable signal to the plurality of touch driving circuits during a second time period and a third time period; a controller configured to obtain a counting value of an internal clock signal of the plurality of touch driving circuits in the second time period and to calculate a calibration value corresponding to the counting value; and a calibration value outputter configured to output the calibration value to at least one of the plurality of touch driving circuits in the third time period.

The touch controller may be driven to: output a first-level counter enable signal to a plurality of touch driving circuits during a first time period; and output a second-level counter enable signal to the plurality of touch driving circuits during a second time period and a third time period, wherein the touch controller may be driven to: obtain a counting value of an internal clock signal of the plurality of touch driving circuits in the second time period; calculate a calibration value corresponding to the counting value; and output the calibration value to at least one of the plurality of touch driving circuits in the third time period.

In still another aspect, a touch driving circuit comprises a register; a clock signal generator configured to generate and output an internal clock signal; and a counter configured to count one period of the internal clock signal output from the clock signal generator during a first time period and to store a counting value of the internal clock signal in the register during a second time period, wherein the clock signal generator adjusts an output frequency of the internal clock signal according to the calibration value stored in the register during a third time period.

According to exemplary embodiments of the present disclosure, a plurality of touch driving circuits controlled by a touch controller may operate using an internal clock signal of each touch driving circuit, thereby preventing electromagnetic interference caused by a signal line for the touch controller to transmit clock signals of the same frequency to the plurality of touch driving circuits.

According to exemplary embodiments of the present disclosure, the touch controller may obtain the counting value of an internal clock signal of each of the plurality of touch driving circuits before sensing a touch and may calibrate the output frequency of the internal clock signal of each touch driving circuit on the basis of the counting value, thereby enabling the plurality of touch driving circuits operating using the internal clock signal to be driven without any operational variation.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1:
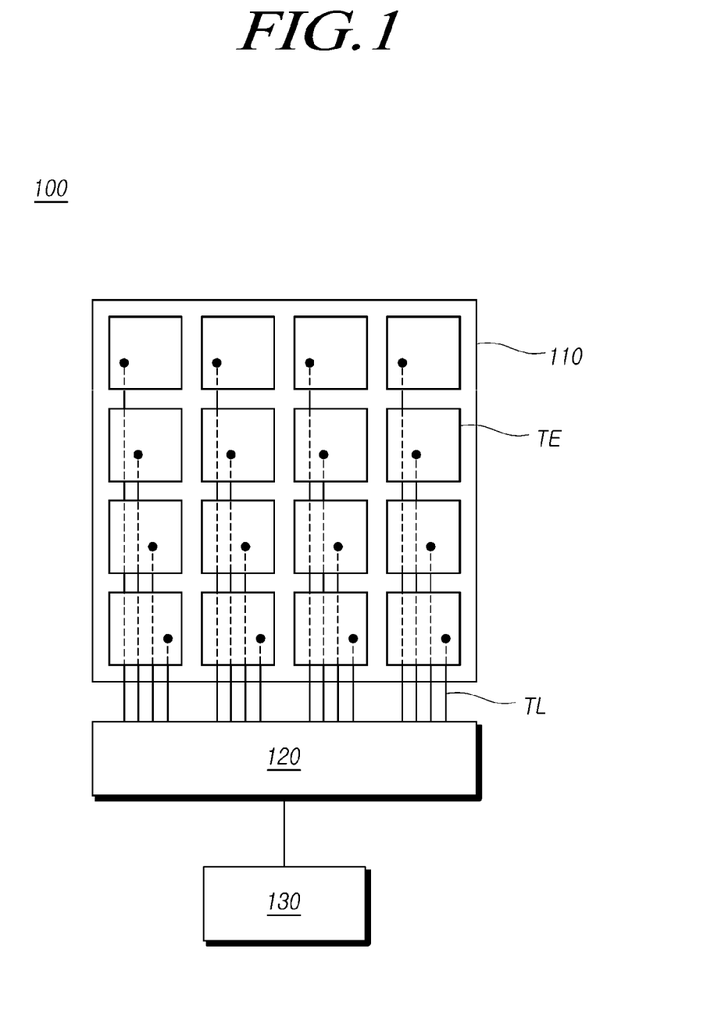
FIG. 1 illustrates the schematic configuration of a touch display device according to exemplary embodiments of the present disclosure.

FIG. 1 illustrates the schematic configuration of a touch display device 100 according to exemplary embodiments of the present disclosure.

Referring to FIG. 1, the touch display device 100 according to the exemplary embodiments of the present disclosure includes: a touch display panel 110 on which a plurality of touch electrodes (TE) and a plurality of touch lines (TL) are disposed; a touch driving circuit 120 to drive the plurality of touch electrodes (TE); and a touch controller 130 to control the touch driving circuit 120.

Although FIG. 1 shows only components for a touch operation for the convenience of description, the touch display device 100 according to the exemplary embodiments of the present disclosure may include all the basic components for a display operation.

The plurality of touch electrodes (TE) may be embedded in the touch display panel 110 or may be disposed as an add-on type on the touch display panel 110.

The plurality of touch electrodes (TE) may be an electrode disposed for a display operation in the touch display panel 110 or an electrode disposed separately from a component for a display operation.

For example, when the touch display device 100 is a liquid crystal display device, a common electrode to which a common voltage is applied during a display operation may be the touch electrodes (TE). That is, a common voltage for a display operation may be applied to the touch electrodes (TE) during a display operation, and a touch driving signal for a touch operation may be applied to the touch electrodes (TE) during a touch operation.

Alternatively, when the touch display device 100 is an organic light emitting display device, the plurality of touch electrodes (TE) may be disposed on a sealing layer. Here, a color filter layer may be disposed on the sealing layer, and the touch electrodes (TE) may be disposed on the color filter layer or between the color filter layer and the sealing layer.

The plurality of touch electrodes (TE) may be disposed such that a plurality of touch electrodes (TE) performing the same function is disposed separately from each other or such that a TX electrode, to which a touch driving signal is applied, and an RX electrode used to obtain a touch sensing signal are separately disposed.

When the plurality of touch electrodes (TE) performing the same function is separately disposed, a separate touch line (TL) may be connected to each touch electrode (TE). In this case, the touch driving circuit 120 may output a touch driving signal to each touch electrode (TE) and may obtain a touch sensing signal from each touch electrode (TE) (self-capacitance sensing).

When the plurality of touch electrodes (TE) is disposed such that the TX electrode and the RX electrode are separately disposed, a touch line (TL) connected to the TX electrode and a touch line (TL) connected to the RX electrode may be disposed along an outer region of the touch display panel 110. The touch driving circuit 120 may output a touch driving signal to the TX electrode and may obtain a touch sensing signal from the RX electrode (mutual capacitance sensing).

The touch driving circuit 120 applies a touch driving signal to the plurality of touch electrodes (TE) during a touch operation, and senses a change in capacitance that occurs when a touch is made. The touch driving circuit 120 converts a sensed signal sensing data and transmits the converted sensing data to the touch controller 130.

Two or more touch driving circuits 120 may be disposed depending on the touch display device 100, and each touch driving circuit 120 may drive at least one touch electrode (TE) among the plurality of touch electrodes (TE).

The touch controller 130 controls the touch driving circuit 120. During a touch operation, the touch controller 130 receives sensing data from the touch driving circuit 120 and senses a touch on the touch display panel 110 using the received sensing data.

Here, the touch controller 130 may control two or more touch driving circuits 120 connected to the touch controller 130 and may output a signal (e.g., clock signal) for controlling the operation of the touch driving circuits 120 to each touch driving circuit 120.

The clock signal is used to control the operation of each touch driving circuit 120. In order to prevent an operation control variation (e.g., sensing data variation) between the touch driving circuits 120, a clock signal of the same frequency may be applied to the two or more touch driving circuits 120.

Accordingly, as the clock signal of the same frequency is transmitted through a clock signal line connecting the touch controller 130 and the plurality of touch driving circuits 120, the clock signal line functions as an antenna to possibly cause electromagnetic interference.

The exemplary embodiments of the present disclosure provide the touch driving circuit 120, the touch controller 130, and the touch display device 100 which are capable of preventing electromagnetic interference caused by the clock signal line and controlling the operation of the plurality of touch driving circuits 120 without any operational variation.

Figure 2:
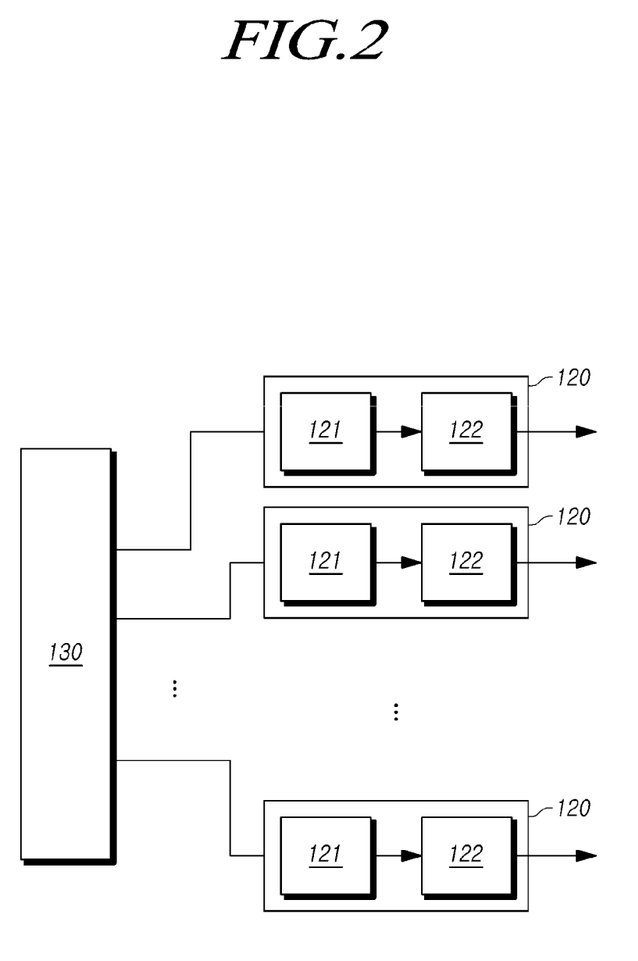
FIG. 2 illustrates the schematic configuration of a touch controller and a touch driving circuit in a touch display device according to exemplary embodiments of the present disclosure.

FIG. 2 illustrates the configuration of a touch driving circuit 120 and a touch controller 130 in a touch display device 100 according to exemplary embodiments of the present disclosure.

Referring to FIG. 2, the touch controller 130 according to the exemplary embodiments of the present disclosure may be connected to a plurality of touch driving circuits 120 and may control the plurality of touch driving circuits 120.

Each touch driving circuit 120 includes a clock signal outputter 121 to generate and output an internal clock signal and a touch driver 122 to output a touch driving signal, to obtain a touch sensing signal, and to generate sensing data.

Each touch driving circuit 120 operates using an internal clock signal generated by the clock signal outputter 121.

For example, each touch driving circuit 120 may output a touch driving signal or may obtain a touch sensing signal in accordance with the timing of an internal clock signal.

That is, the touch driving circuits 120 according to the exemplary embodiments of the present disclosure operate using an internal clock signal generated from each touch driving circuit 120, instead of using a clock signal output from the touch controller 130.

Therefore, a line for transmitting a clock signal between the touch controller 130 and the plurality of touch driving circuits 120 is not needed, thus preventing electromagnetic interference caused by a clock signal line through which a clock signal of the same frequency is transmitted.

Here, since the plurality of touch driving circuits 120 operates using separate internal clock signals, when a variation (e.g., an output frequency variation) between the internal clock signals occurs, the touch driving circuits 120 may operate differently.

For example, due to the variation in the internal clock signals, the operation timings of the touch driving circuits 120 may be different, or the number of touch sensing signals obtained in the same time period may vary.

The touch driving circuits 120 and the touch controller 130 according to the exemplary embodiments of the present disclosure may provide a method for improving electromagnetic interference caused by a clock signal line and driving each touch driving circuit 120 without any operation variation.

Figure 3:
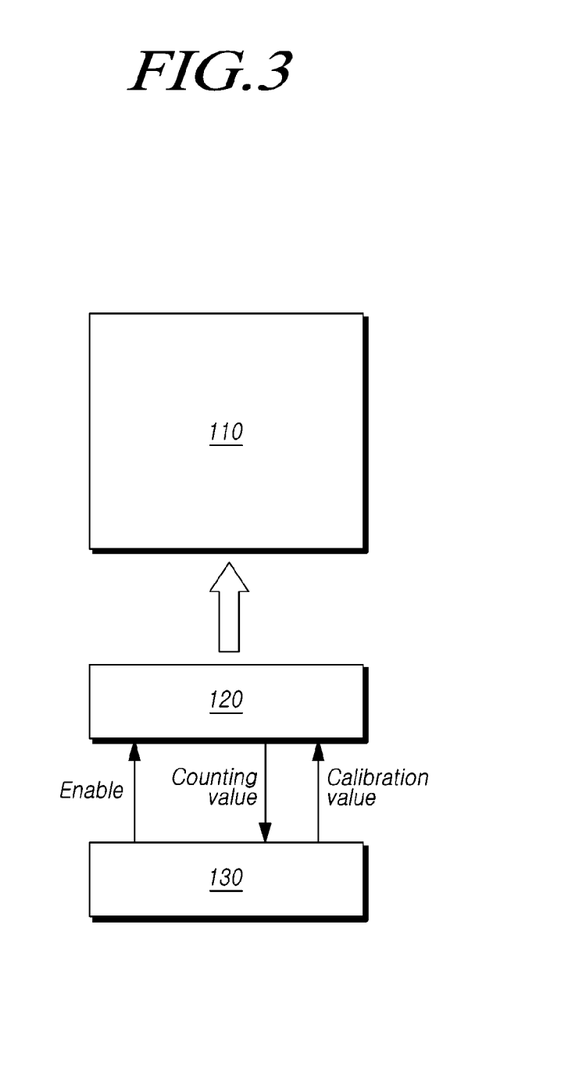
FIG. 3 illustrates a method in which a touch controller calibrates a variation in output frequency of an internal clock signal of a touch driving circuit in a touch display device according to exemplary embodiments of the present disclosure.

FIG. 3 illustrates a method for calibrating a variation in internal clock signal from each touch driving circuits 120 when a touch display device 100 includes a plurality of touch driving circuits 120 operating using an internal clock signal according to exemplary embodiments of the present disclosure.

Referring to FIG. 3, a touch controller 130 according to the exemplary embodiments of the present disclosure may calibrate a variation in internal clock signal from each touch driving circuit 120 before performing touch sensing using the plurality of touch driving circuits 120.

For example, the touch controller 130 may obtain a counting value of an internal clock signal from each touch driving circuit 120 before performing touch sensing, may calculate a calibration value corresponding to the counting value, and may output the calibration value to each touch driving circuit 120.

Each touch driving circuit 120 may calibrate the internal clock signal on the basis of the calibration value received from the touch controller 130, thereby preventing the occurrence of an operational variation between the touch driving circuits 120 due to a variation in internal clock signal.

The calibration of the internal clock signal may be performed at initial calibration after the touch display device 100 is powered on.

Specifically, the touch controller 130 may output, to the plurality of touch driving circuits 120, a first-level (e.g., high-level) counter enable signal to instruct a counter included in each touch driving circuit 120 to operate.

Each touch driving circuit 120 counts, using a counter, one period of an internal clock signal output during a time period in which the first-level counter enable signal is received from the touch controller 130.

The touch controller 130 outputs a second-level (e.g., low-level) counter enable signal to each touch driving circuit 120 after a lapse of a certain time.

Upon receiving the second-level counter enable signal from the touch controller 130, each touch driving circuit 120 transmits, to the touch controller 130, the counting value of the internal clock signal counted during the time period in which the first-level counter enable signal is received.

The touch controller 130 compares the counting values of the internal clock signals obtained from the respective touch driving circuits 120 and calculates a calibration value corresponding to each counting value.

That is, the touch controller 130 identifies a variation in output frequency between the internal clock signals from the respective touch driving circuits 120 using the counting values of the internal clock signals during the same time period and calculates a calibration value for calibrating the variation in output frequency between the internal clock signals.

For example, when the counting value of an internal clock signal is smaller than a specific value, the touch controller 130 calculates a calibration value for increasing the output frequency of the internal clock signal of a touch driving circuit 120 corresponding to the counting value. When the counting value of an internal clock signal is greater than the specific value, the touch controller 130 calculates a calibration value for reducing the output frequency of the internal clock signal of a touch driving circuit 120 corresponding to the counting value.

Here, the specific value may be a median value or the average of the counting values of the internal clock signals obtained from the respective touch driving circuits 120 or may be a predetermined value to match the operating frequency of each touch driving circuit 120.

Therefore, each touch driving circuit 120 calibrates the output frequency of the internal clock signal according to the calibration value received from the touch controller 130, so that the touch driving circuits 120 can operate according to the internal clock signals of the same frequency.

Figure 4:
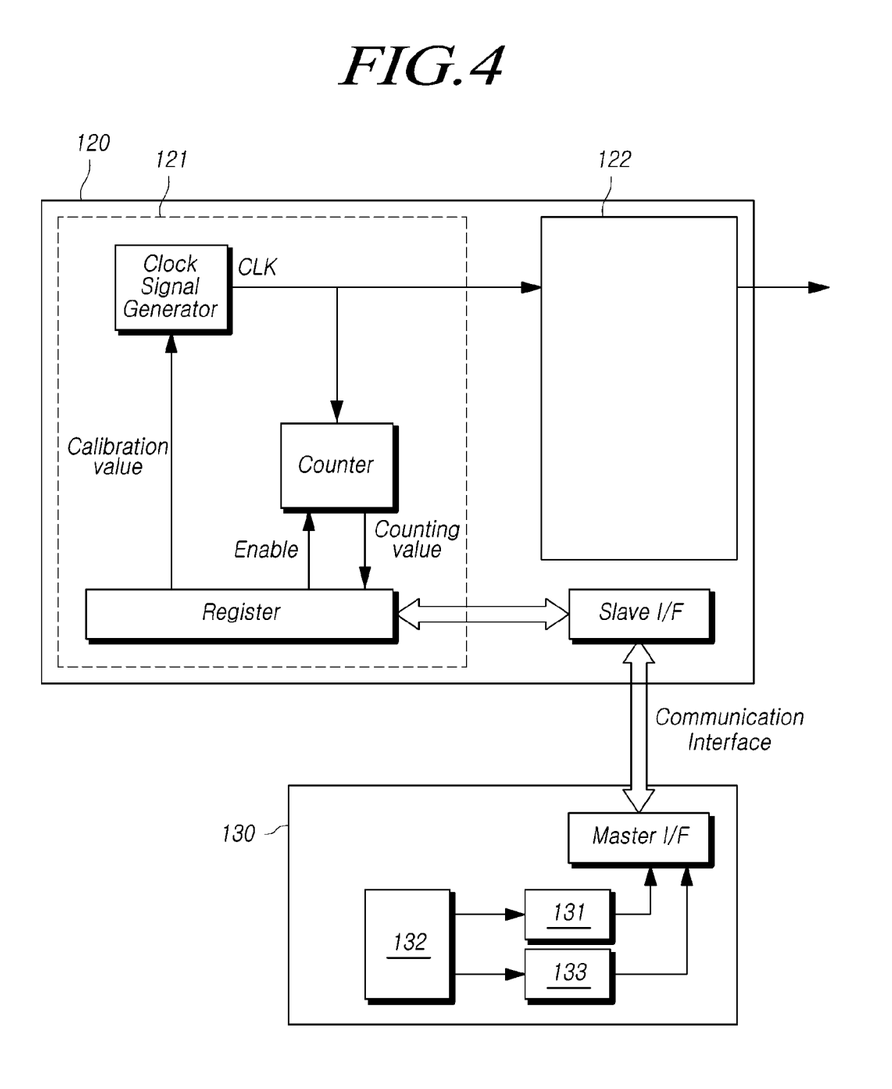
FIG. 4 illustrates the detailed configuration of a touch controller and a touch driving circuit in a touch display device according to exemplary embodiments of the present disclosure.

FIG. 4 illustrates the detailed configuration of a touch driving circuit 120 and a touch controller 130 according to exemplary embodiments of the present disclosure.

Referring to FIG. 4, the touch driving circuit 120 according to the exemplary embodiments of the present disclosure includes a clock signal outputter 121 and a touch driver 122, and the clock signal outputter 121 may include a clock signal generator, a counter, and a register.

The touch controller 130 may include a counter enable signal outputter 131, a controller 132, and a calibration value outputter 133.

The touch controller 130 and the touch driving circuit 120 may transmit and receive a signal and information through input/output interfaces (e.g., I2C, SPI, or GPIO) that communicate with each other.

The clock signal generator in the clock signal outputter 121 of the touch driving circuit 120 generates and outputs an internal clock signal used for the operation of the touch driving circuit 120.

The counter of the clock signal outputter 121 counts one period of an internal clock signal output from the clock signal generator according to a counter enable signal value stored in the register and stores the counting value of the internal clock signal in the register.

For example, when the counter enable signal value stored in the register is a first value (e.g., high), the counter counts one period of the internal clock signal. When the counter enable signal value is a second value (e.g., low), the counter terminates counting.

The register may store a counter enable signal value corresponding to the counter enable signal received from the touch controller 130, a counting value of an internal clock signal, and a calibration value received from the touch controller 130 corresponding to a counting value.

The clock signal generator adjusts the output frequency of an internal clock signal according to a calibration value stored in the register and outputs the internal clock signal.

The counter enable signal outputter 131 of the touch controller 130 outputs a first-level or second-level counter enable signal to the touch driving circuit 120 under the control of the controller 132.

The counter enable signal outputter 131 outputs a first-level counter enable signal for a certain period time and then outputs a second-level counter enable signal.

When the counter enable signal outputter 131 outputs a second-level counter enable signal, the controller 132 of the touch controller 130 obtains the counting value of an internal clock signal counted by the counter of the touch driving circuit 120 during a time period in which a first-level counter enable signal is output.

The controller 132 compares the counting values of internal clock signals respectively obtained from a plurality of touch driving circuits 120.

The controller 132 of the touch controller 130 identifies a variation in output frequency between the internal clock signals on the basis of the counting values of the internal clock signals of the respective touch driving circuits 120 and calculates a calibration value to calibrate the output frequencies of the internal clock signals to be the same.

That is, the controller 132 calculates a calibration value that corresponds to the counting value of an internal clock signal obtained from each touch driving circuit 120 and is to increase or reduce the output frequency of the internal clock signal on the basis of the counting value.

The controller 132 outputs the calibration value corresponding to the counting value of the internal clock signal from each touch driving circuit 120 to each touch driving circuit 120 through the calibration value outputter 133.

Accordingly, before performing touch sensing, the touch controller 130 operates the counter of the plurality of touch driving circuits 120 operating using the internal clock signal and counts one period of the internal clock signal. When the count is completed, the touch controller 130 reads the counting value of the internal clock signal from the register of the touch driving circuits 120 and enters a calibration value corresponding to the counting value into the register, so that the touch driving circuits 120 can adjust the output frequency of the internal clock signal according to the calibration value.

The touch controller 130 performs touch sensing during a time period in which the touch driving circuits 120 operate using the calibrated internal clock signal, thereby obtaining sensing data while controlling the touch driving circuits 120 without any operational variation between the touch driving circuits 120 operating with the internal clock signal.

Figure 5:
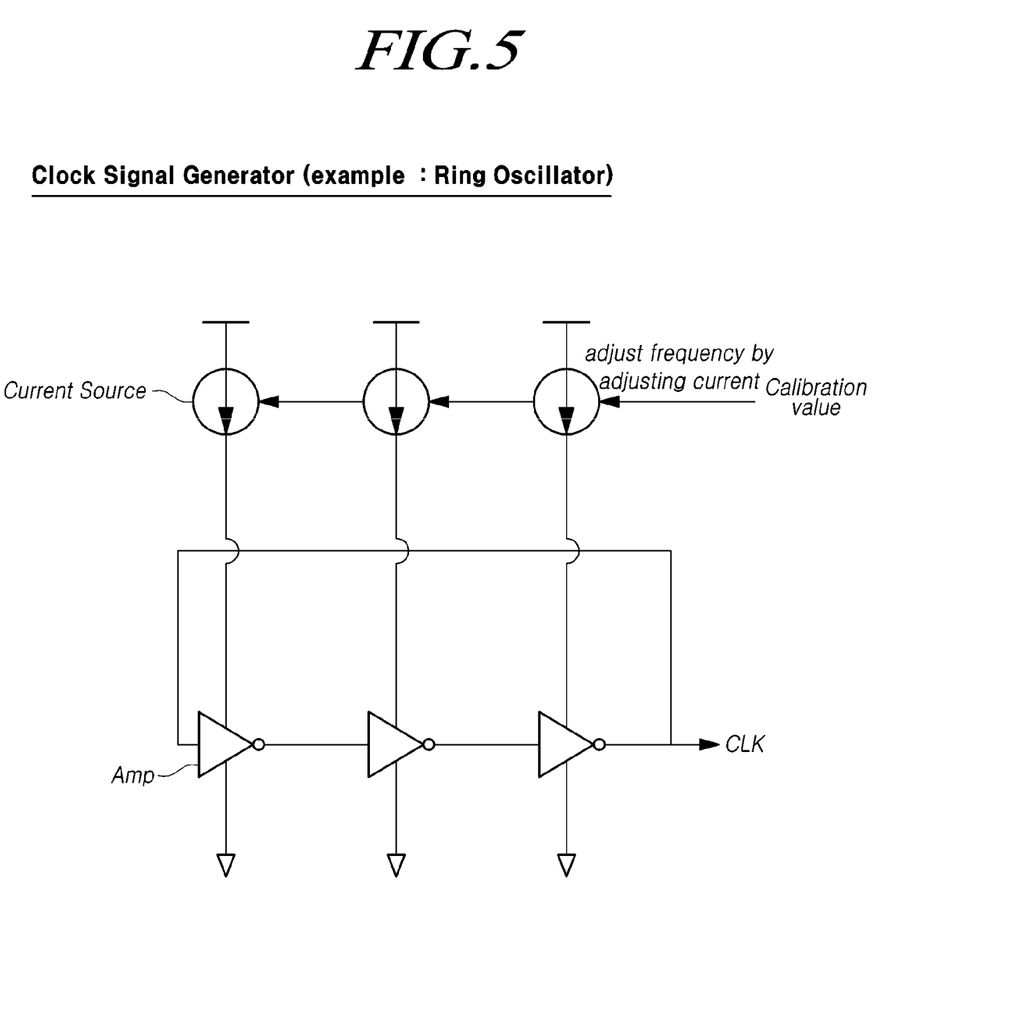
FIG. 5 illustrates the configuration of a clock signal generator in a touch driving circuit according to exemplary embodiments of the present disclosure.

FIG. 5 illustrates the configuration of the clock signal generator that generates and outputs an internal clock signal in the foregoing touch driving circuit 120.

Referring to FIG. 5, the clock signal generator of the touch driving circuit 120 according to the exemplary embodiments of the present disclosure may be a ring oscillator including one or more current sources and one or more amplifiers.

The one or more current sources control the frequency of an internal clock signal and control the frequency according to the amount of current adjusted depending on a received calibration value corresponding to the counting value of the internal clock signal.

The one or more amplifiers output an internal clock signal according to a frequency controlled by the current sources.

Accordingly, the clock signal generator may generate and output an internal clock signal in the touch driving circuit 120 and may output an internal clock signal with the output frequency calibrated according to a calibration value.

The foregoing structure of the clock signal generator is an example. Alternatively, the clock signal generator may include one or more inverters and one or more capacitors or may include various circuit elements.

Figure 6:
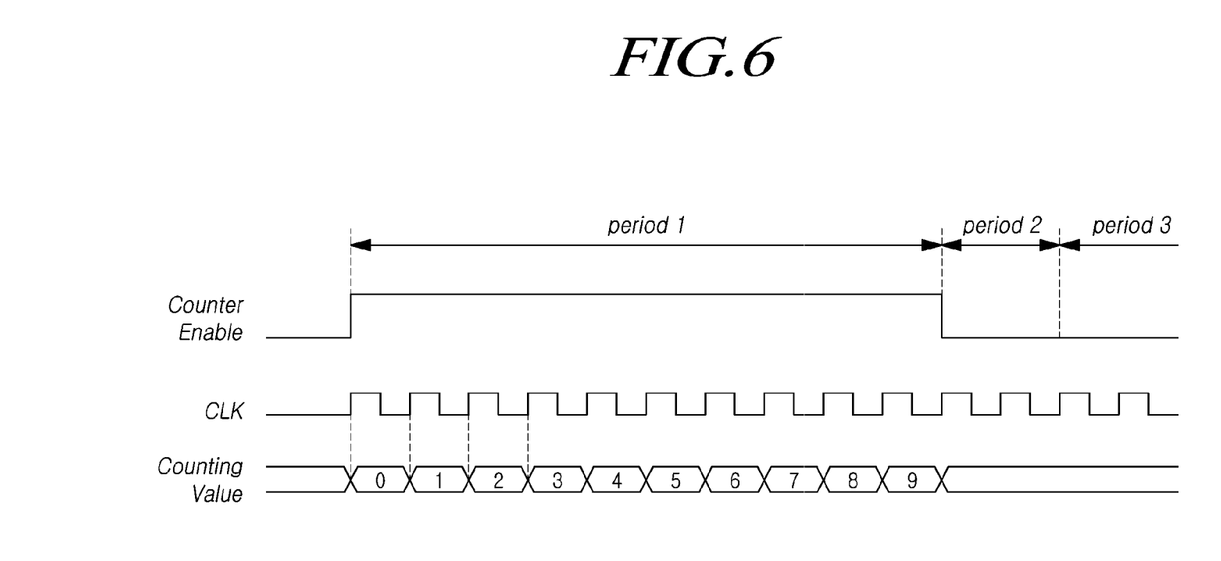
FIG. 6 illustrates a method in which a touch driving circuit counts an internal clock signal according to exemplary embodiments of the present disclosure.

FIG. 6 illustrates a method in which a counter counts one period of an internal clock signal in a touch driving circuit 120 according to exemplary embodiments of the present disclosure.

Referring to FIG. 6, the touch driving circuit 120 receives a first-level counter enable signal from a touch controller 130 during a first time period.

The counter of the touch driving circuit 120 is initialized at the time of starting to receive the first-level counter enable signal and counts one period of an internal clock signal output from a clock signal generator during the first time period.

The touch driving circuit 120 receives a second-level counter enable signal from the touch controller 130 when the first time period expires.

When the second-level counter enable signal is received, the counter of the touch driving circuit 120 terminates counting the internal clock signal and stores the counting value of the internal clock signal in a register.

The counting value of the internal clock signal counted during the first time period is obtained by the touch controller 130 after the first time period (e.g., in a second time period).

Then, a calibration value that the touch controller 130 calculates on the basis of the counting value after the touch controller 130 obtains the counting value of the internal clock signal (e.g., in a third time period) is stored in the register.

The clock signal generator of the touch driving circuit 120 adjusts the output frequency of the internal clock signal according to the calibration value stored in the register, so that the touch driving circuit 120 operates according to the internal clock signal having the same frequency as that of the other touch driving circuit 120.

Figure 7:
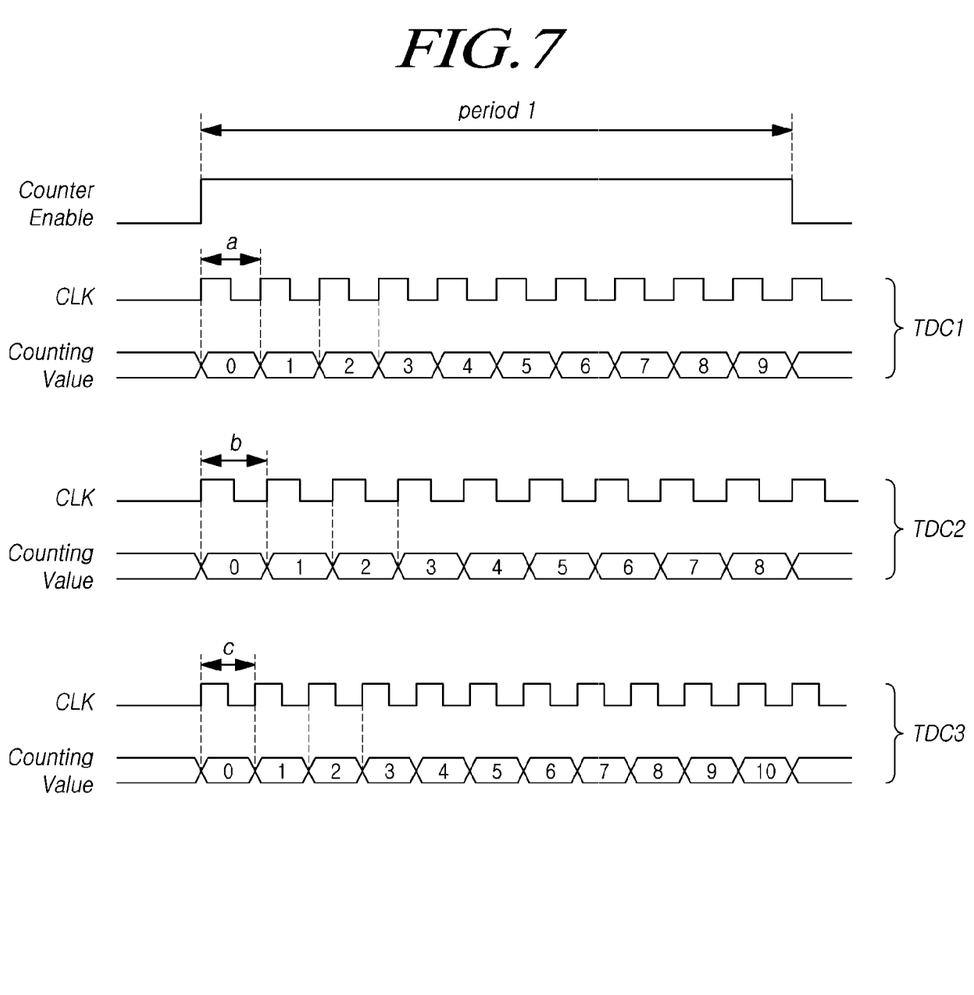
FIG. 7 illustrates an example in which an output frequency variation occurs between internal clock signals of a plurality of touch driving circuits according to exemplary embodiments of the present disclosure.

FIG. 7 illustrates an example in which a plurality of touch driving circuits 120 respectively obtains different counting values of internal clock signals according to exemplary embodiments of the present disclosure.

Referring to FIG. 7, a first touch driving circuit (TDC1), a second touch driving circuit (TDC2), and a third touch driving circuit (TDC3) counts one period of an internal clock signal during a first time period in which a first-level counter enable signal is received from a touch controller 130.

When the first time period expires, each of the touch driving circuits 120 stores the counting value of the internal clock signal counted during the first time period in each register.

For example, the counting value of the internal clock signal counted by the first touch driving circuit (TDC1) during the first time period may be 9 (10 periods of the internal clock signal), the counting value of the internal clock signal of the second touch driving circuit (TDC2) may be 8 (9 periods of the internal clock signal), and the counting value of the internal clock signal of the third touch driving circuit (TDC3) may be 10 (11 periods of the internal clock signal).

One period of the internal clock signal of the first touch driving circuit (TDC1) is a, one period of the internal clock signal of the second touch driving circuit (TDC2) is b, and one period of the internal clock signal of the third touch driving circuit (TDC3) is c.

That is, since the counting values of the internal clock signals are different for the respective touch driving circuits 120, the output frequencies of the internal clock signals are different.

The touch controller 130 may calculate a calibration value for adjusting the output frequencies of the internal clock signals of the respective touch driving circuits 120 to be the same on the basis of the counting values of the internal clock signals of the respective touch driving circuits 120.

Here, the touch controller 130 may calculate a calibration value for adjusting the output frequencies of the internal clock signals of the respective touch driving circuits 120 in accordance with a predetermined specific value or may calculate a calibration value on the basis of any one of the touch driving circuits 120.

For example, the touch controller 130 may calculate a calibration value for adjusting the output frequencies of the internal clock signals of the second touch driving circuit (TDC2) and the third touch driving circuit (TDC3) in accordance with of the output frequency of the internal clock signal of the first touch driving circuit (TDC1).

Since the output frequency of the internal clock signal of the second touch driving circuit (TDC2) is lower than the output frequency of the internal clock signal of the first touch driving circuit (TDC1), the touch controller 130 may calculate a calibration value (e.g., 10/9) for increasing the output frequency of the internal clock signal of the second touch driving circuit (TDC2).

Further, since the output frequency of the internal clock signal of the third touch driving circuit (TDC3) is higher than the output frequency of the internal clock signal of the first touch driving circuit (TDC1), the touch controller 130 may calculate a calibration value (e.g., 10/11) for reducing the output frequency of the internal clock signal of the third touch driving circuit (TDC3).

The touch controller 130 outputs the calibration values to the second touch driving circuit (TDC2) and the third touch driving circuit (TDC3).

The second touch driving circuit (TDC2) and the third touch driving circuit (TDC3) adjust the output frequency of the internal clock signal according to the calibration values received from the touch controller 130 and output the calibrated internal clock signal.

Therefore, the second touch driving circuit (TDC2) and the third touch driving circuit (TDC3) output the internal clock signals at the same frequency as the output frequency of the internal clock signal of the first touch driving circuit (TDC1). Accordingly, the respective touch driving circuits 120 operate using the internal clock signals having the same frequency, thus preventing the occurrence of an operational variation between the touch driving circuits 120.

Figure 8:
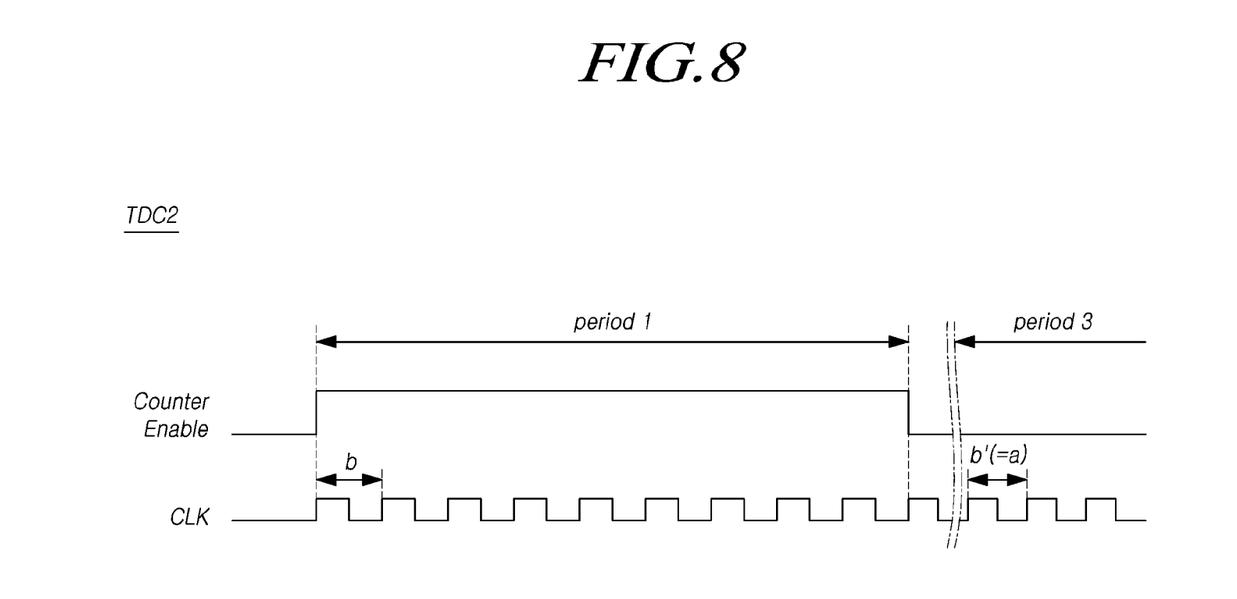
FIGS. 8 and 9 illustrate examples of calibrating the output frequency variation between the internal clock signals of the plurality of touch driving circuits illustrated in FIG. 7.
Figure 9:
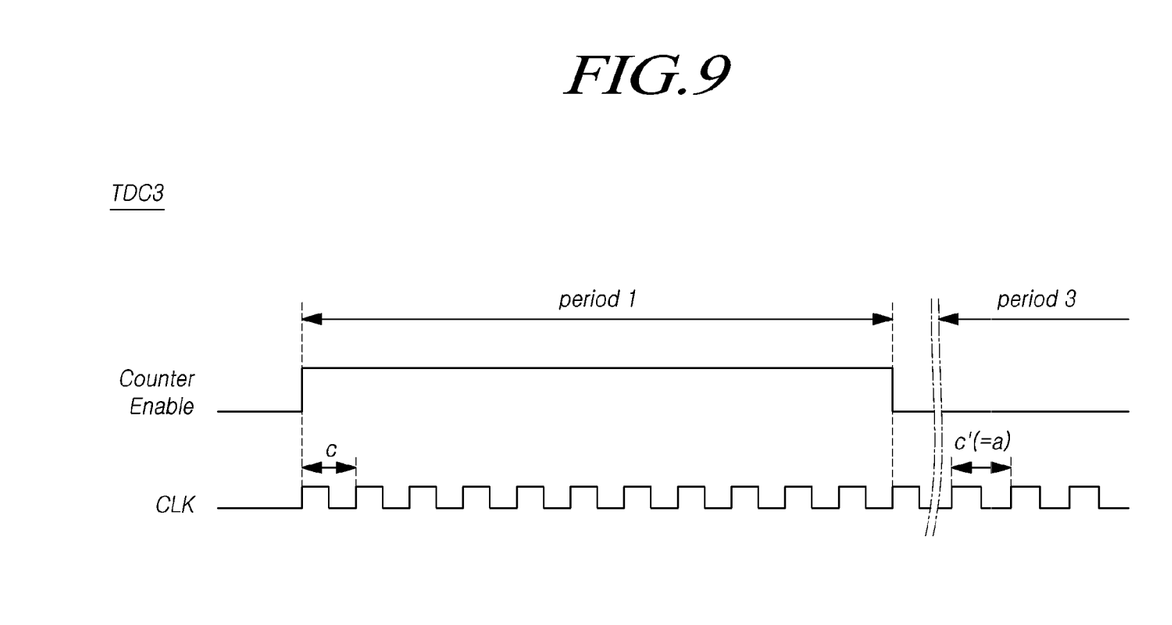

FIGS. 8 and 9 illustrate examples in which a second touch driving circuit (TDC2) and a third touch driving circuit (TDC3), which have received a calibration value from a touch controller 130, output a calibrated internal clock signal.

Referring to FIG. 8, the second touch driving circuit (TDC2) receives a calibration value from the touch controller 130 in a third time period after a second time period in which the touch controller 130 obtains the counting value of an internal clock signal.

The second touch driving circuit (TDC2) increases the output frequency of the internal clock signal according to the calibration value and outputs the internal clock signal having the same output frequency as that of the internal clock signal of a first touch driving circuit (TDC1).

Referring to FIG. 9, the third touch driving circuit (TDC3) receives a calibration value from the touch controller 130 in a third time period after a second time period in which the touch controller 130 obtains the counting value of an internal clock signal.

The second touch driving circuit (TDC2) reduces the output frequency of the internal clock signal according to the calibration value and outputs the internal clock signal having the same output frequency as that of the internal clock signal of a first touch driving circuit (TDC1).

Therefore, after receiving the calibration value, the second touch driving circuit (TDC2) and the third touch driving circuit (TDC3) operate using the internal clock signal having the same frequency as that of the first touch driving circuit (TDC1).

The touch controller 130 performs touch sensing after the output frequencies of the internal clock signals of the second touch driving circuit (TDC2) and the third touch driving circuit (TDC3) are calibrated, thereby performing touch sensing while controlling the touch driving circuits 120 without any operational variation between the touch driving circuits 120.

Figure 10:
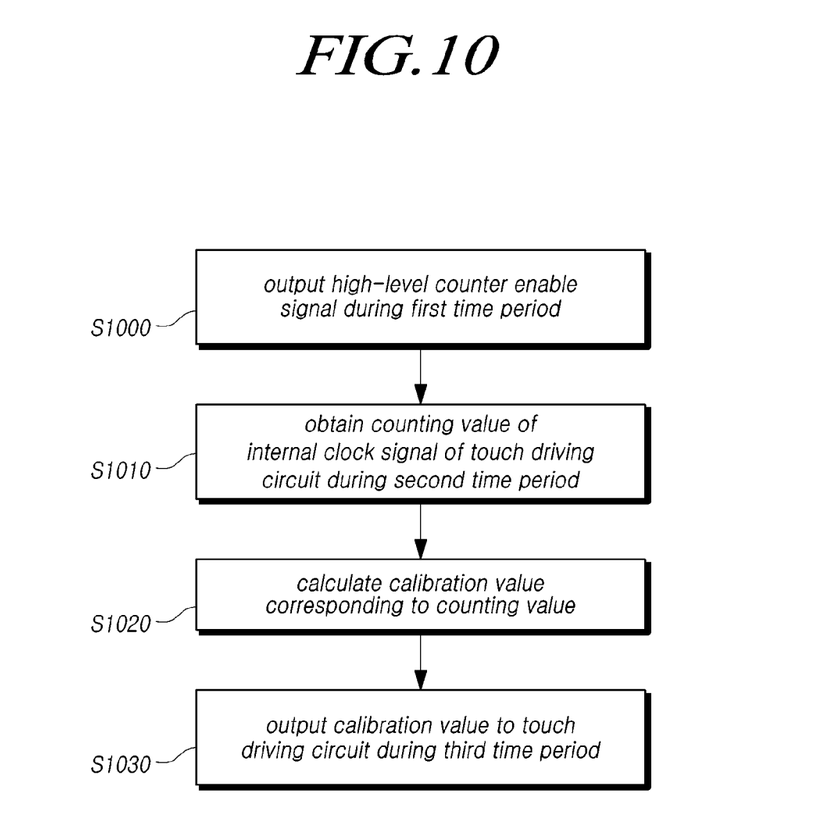
FIG. 10 illustrates a method for driving a touch controller according to exemplary embodiments of the present disclosure.

FIG. 10 illustrates a method for driving a touch controller 130 according to exemplary embodiments of the present disclosure.

Referring to FIG. 10, the touch controller 130 according to the exemplary embodiment of the present disclosure outputs a high-level counter enable signal to each touch driving circuit 120 during a first time period (S1000).

The touch controller 130 outputs a low-level counter enable signal to each touch driving circuit 120 when the first time period expires. During the second time period, the touch controller 130 obtains the counting value of an internal clock signal of each touch driving circuit 120 counted during the first time period (S1010).

The touch controller 130 identifies the counting value of the internal clock signal obtained from each touch driving circuit 120 and calculates a calibration value corresponding to each counting value (S1020).

Here, the calibration value may be a value calculated to adjust the output frequency of the internal clock signal from each touch driving circuit 120 to be the same.

The touch controller 130 outputs the calculated calibration value in a third time period to each of touch driving circuit 120 (S1030).

Figure 11:
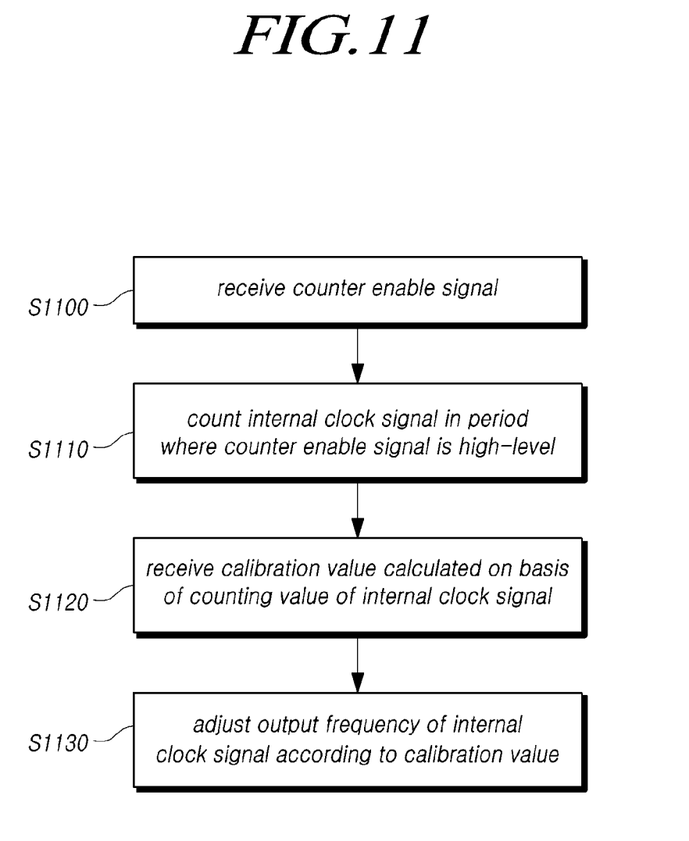
FIG. 11 illustrates a method for driving a touch driving circuit according to exemplary embodiments of the present disclosure.

FIG. 11 illustrates a method for driving a touch driving circuit 120 according to exemplary embodiments of the present disclosure.

Referring to FIG. 11, the touch driving circuit 120 according to the exemplary embodiments of the present disclosure receives a high-level or low-level counter enable signal from a touch controller 130 (S1100).

The touch driving circuit 120 counts one period of an internal clock signal during a time period in which the high-level counter enable signal is received the touch controller 130 (S1110).

Upon receiving a low-level counter enable signal from the touch controller 130, the touch driving circuit 120 transmits the counting value of the internal clock signal, which is counted during the time period in which the high-level counter enable signal is received, to the touch controller 130.

Here, the counting value of the internal clock signal may be entered into a register of the touch driving circuit 120, and the touch controller 130 may read the counting value through an input/output interface with the touch driving circuit 120.

The touch driving circuit 120 receives a calibration value calculated on the basis of the counting value of the internal clock signal from the touch controller 130 (S1120).

The touch controller 130 may enter the calibration value into the register of the touch driving circuit 120 through the input/output interface with the touch driving circuit 120.

The touch driving circuit 120 adjusts the output frequency of the internal clock signal according to the calibration value and outputs the calibrated internal clock signal (S1130).

According to exemplary embodiments of the present disclosure, a plurality of touch driving circuits 120 controlled by a touch controller 130 may operate using an internal clock signal, so that a clock signal line for transmitting clock signals of the same frequency from the touch controller 130 is not needed, thus preventing electromagnetic interference caused by the clock signal line.

Further, the touch controller 130 may calculates a calibration value for adjusting the output frequencies of internal clock signals of the respective touch driving circuits 120 to be the same on the basis of the counting values of the internal clock signals of the respective touch driving circuits 120 obtained for a certain time. The respective touch driving circuits 120 operate using the internal clock signals calibrated according to the calibration value, thereby driving the touch driving circuits 120 without any operational variation.

The touch controller 130 performs touch sensing after the respective touch driving circuits 120 start to operate using the internal clock signals having the same frequency, performing touch sensing while controlling the plurality of touch driving circuits 120 operating with the internal clock signals without any operational variation.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:
1. A touch display device, comprising:
a touch display panel on which a plurality of touch electrodes is disposed;
a plurality of touch driving circuits configured to drive at least one touch electrode among the plurality of touch electrodes; and
a touch controller configured to control the plurality of touch driving circuits,
wherein when the touch controller outputs a first-level counter enable signal to the plurality of touch driving circuits during a first time period, each of the plurality of touch driving circuits counts an internal clock signal output during the first time period, and
when a second-level counter enable signal from the touch controller is received to each of the plurality of touch driving circuits during a second time period, each of the plurality of touch driving circuits stores a counting value of the internal clock signal in a register of each of the plurality of touch driving circuits, and wherein the touch controller obtains the counting value of the internal clock signal from each of the plurality of touch driving circuits, and outputs a calibration value for the internal clock signal to at least one of the plurality of touch driving circuits.

2. The touch display device of claim 1, wherein the touch controller calculates the calibration value on the basis of the counting value of the internal clock signal, and the calibration value is a value for calibrating an output frequency of the internal clock signal from each of the plurality of touch driving circuits to be the same.

3. The touch display device of claim 1, wherein the touch controller calculates a first calibration value for a first touch driving circuit from which a first counting value is obtained and calculates a second calibration value for a second touch driving circuit from which a second counting value is obtained, and the first calibration value is smaller than the second calibration value when the first counting value is greater than the second counting value.

4. The touch display device of claim 1, wherein the touch controller calculates the calibration value to increase an output frequency of the internal clock signal when the counting value of the internal clock signal is smaller than a predetermined value, and calculates the calibration value to reduce the output frequency of the internal clock signal when the counting value of the internal clock signal is greater than the predetermined value.

5. The touch display device of claim 1, wherein the touch controller senses a touch on the touch display panel after outputting the calibration value to at least one of the plurality of touch driving circuits in a third time period.

6. The touch display device of claim 1, wherein each of the plurality of touch driving circuits comprises:

a clock signal generator configured to output the internal clock signal; and a counter configured to count one period of the internal clock signal output from the clock signal generator during the first time period.

7. The touch display device of claim 6, wherein the touch controller obtains the counting value of the internal clock signal stored in the register through an input/output interface communicating with the plurality of touch driving circuits and stores the calibration value in the register.

8. The touch display device of claim 6, wherein the counter is initialized when the first time period starts, and maintains the counting value of the internal clock signal during the second time period and a third time period.

9. The touch display device of claim 6, wherein the clock signal generator comprises:

one or more current sources configured to control a frequency according to a current amount adjusted on the basis of the calibration value; and one or more amplifiers configured to output the internal clock signal according to the frequency controlled by the one or more current sources.

10. The touch display device of claim 1, wherein at least one of the plurality of touch driving circuits outputs the internal clock signal in the first time period, of which an output frequency is different from an output frequency of the internal clock signal output in at least part of a third time period.

11. A touch controller, comprising:

a counter enable signal outputter configured to output a first-level counter enable signal that causes each of a plurality of touch driving circuits to count an outputted internal clock signal to the plurality of touch driving circuits during a first time period and to output a second-level counter enable signal that causes each of the plurality of touch driving circuits to store a counting value of the internal clock signal in a register of each of the plurality of touch driving circuits to the plurality of touch driving circuits during a second time period;

a controller configured to obtain the counting value of the internal clock signal stored in the register of each of the plurality of touch driving circuits in the second time period and to calculate a calibration value corresponding to the counting value; and a calibration value outputter configured to output the calibration value to at least one of the plurality of touch driving circuits in a third time period.

12. The touch controller of claim 11, wherein the controller calculates the calibration value for calibrating an output frequency of the internal clock signal from each of the plurality of touch driving circuits to be the same.

13. A method for driving a touch controller, the method comprising:

outputting a first-level counter enable signal that causes each of a plurality of touch driving circuits to count an outputted internal clock signal to the plurality of touch driving circuits during a first time period; and outputting a second-level counter enable signal that causes each of the plurality of touch driving circuits to store a counting value of the internal clock signal in a register of each of the plurality of touch driving circuits to the plurality of touch driving circuits during a second time period, wherein the method comprises obtaining the counting value of the internal clock signal stored in the register of each of the plurality of touch driving circuits in the second time period, calculating a calibration value corresponding to the counting value, and outputting the calibration value to at least one of the plurality of touch driving circuits in a third time period.

* * * * *